United States Patent
Choi (10) Patent No.: US 10,737,724 B2
(45) Date of Patent: Aug. 11, 2020

(54) DEVICE AND METHOD FOR DISPLAYING TARGET PARKING SPACE OF VEHICLE

(71) Applicants: HYUNDAI MOTOR COMPANY, Seoul (KR); KIA MOTORS CORPORATION, Seoul (KR)

(72) Inventor: Jae Seob Choi, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 138 days.

(21) Appl. No.: 15/823,103

(22) Filed: Nov. 27, 2017

(65) Prior Publication Data

US 2019/0111970 A1    Apr. 18, 2019

(30) Foreign Application Priority Data

Oct. 13, 2017    (KR) .................. 10-2017-0133438

(51) Int. Cl.
*B62D 15/02* (2006.01)
*G08G 1/16* (2006.01)

(52) U.S. Cl.
CPC ....... *B62D 15/027* (2013.01); *B62D 15/0285* (2013.01); *G08G 1/168* (2013.01)

(58) Field of Classification Search
CPC .......... G08G 1/168; G08G 1/14; G08G 1/141; G08G 1/142; G08G 1/143; G08G 1/144;

(Continued)

(56) References Cited

U.S. PATENT DOCUMENTS 7,295,227 B1 * 11/2007 Asahi ................. B62D 15/0275
                                                                  348/118
9,361,803 B2    6/2016 Lee (Continued)

FOREIGN PATENT DOCUMENTS

| JP | 4321357 B2 | 8/2009 |
|----|------------|--------|
| KR | 10-2013-0072709 A | 7/2013 |
| KR | 10-1498976 B1 | 3/2015 |

OTHER PUBLICATIONS

Chao et al., Omni-Directional Vision-Based Parallel-Parking Control Design for Car-Like Mobile Robot, 2005, IEEE (Year: 2005).*

*Primary Examiner* — Thomas G Black
*Assistant Examiner* — Sara J Lewandroski
(74) *Attorney, Agent, or Firm* — Morgan, Lewis & Bockius LLP (57) ABSTRACT

The present disclosure relates to a device and a method for displaying a target parking space of a vehicle in order to allow a driver to select an optimal empty parking section. The target parking space display device includes: an information collector collecting a parking reference point and a width of a search space from a parking assist system; an image acquirer acquiring a top-view image; a controller detecting parking section information corresponding to the parking reference point from the top-view image, and detecting a target parking space occupied by the vehicle on the basis of the detected parking section information, the parking reference point, and the width of the search space; and a display displaying the detected target parking space on the top-view image.

14 Claims, 9 Drawing Sheets

(58) Field of Classification Search
CPC ........ G08G 1/145; G08G 1/146; G08G 1/147; G08G 1/148; B60R 2300/806; B62D 15/027; G06K 9/00812; G06T 2207/30264; G01S 2013/9314; G01S 2015/932; G01S 2015/933; G01S 2015/934; G01S 2015/935; G01S 2015/936

See application file for complete search history.

(56) References Cited

U.S. PATENT DOCUMENTS

| | | | | |
|---|---|---|---|---|
| 10,081,390 | B1* | 9/2018 | Anderson | G08G 1/143 |
| 2002/0005779 | A1* | 1/2002 | Ishii | B62D 15/0285 |
| | | | | 340/436 |
| 2004/0204807 | A1* | 10/2004 | Kimura | B62D 15/028 |
| | | | | 701/36 |
| 2009/0174574 | A1* | 7/2009 | Endo | B60R 1/00 |
| | | | | 340/932.2 |
| 2009/0278709 | A1* | 11/2009 | Endo | B62D 15/027 |
| | | | | 340/932.2 |
| 2010/0049402 | A1* | 2/2010 | Tanaka | B60R 1/00 |
| | | | | 701/41 |
| 2010/0274446 | A1* | 10/2010 | Sasajima | G08G 1/165 |
| | | | | 701/36 |
| 2012/0062396 | A1* | 3/2012 | Inoue | B62D 15/027 |
| | | | | 340/932.2 |
| 2013/0162829 | A1* | 6/2013 | Kadowaki | B60R 1/00 |
| | | | | 348/148 |
| 2013/0166190 | A1* | 6/2013 | Ikeda | B60R 1/00 |
| | | | | 701/400 |
| 2014/0176718 | A1* | 6/2014 | Kim | B60Q 1/48 |
| | | | | 348/148 |
| 2015/0070196 | A1* | 3/2015 | Beaurepaire | B62D 15/028 |
| | | | | 340/932.2 |
| 2015/0179075 | A1* | 6/2015 | Lee | G08G 1/165 |
| | | | | 340/932.2 |
| 2016/0001704 | A1* | 1/2016 | Nakasho | B60R 1/00 |
| | | | | 701/36 |
| 2016/0068187 | A1* | 3/2016 | Hata | B62D 15/0275 |
| | | | | 701/41 |
| 2016/0075374 | A1* | 3/2016 | Yamashita | B62D 15/027 |
| | | | | 701/41 |
| 2016/0078764 | A1* | 3/2016 | Kiyokawa | G08G 1/168 |
| | | | | 701/301 |
| 2016/0110619 | A1* | 4/2016 | Kim | B62D 15/027 |
| | | | | 382/104 |
| 2016/0284217 | A1* | 9/2016 | Lee | B60K 35/00 |
| 2017/0203769 | A1* | 7/2017 | Ohta | B60W 10/22 |
| 2018/0095474 | A1* | 4/2018 | Batur | G06K 9/6212 |
| 2018/0178840 | A1* | 6/2018 | Li | B60W 30/06 |
| 2018/0180731 | A1* | 6/2018 | Inoue | B60W 40/02 |
| 2018/0322349 | A1* | 11/2018 | Hayakawa | G06K 9/00825 |
| 2018/0327028 | A1* | 11/2018 | Kamiyama | B62D 15/028 |
| 2019/0047472 | A1* | 2/2019 | Chaaya | G01S 13/72 |
| 2019/0073901 | A1* | 3/2019 | Shurkhovetskyy | G08G 1/147 |
| 2019/0073902 | A1* | 3/2019 | Indoh | G08G 1/143 |
| 2019/0084618 | A1* | 3/2019 | Numata | B60R 21/00 |
| 2019/0096261 | A1* | 3/2019 | Hayashi | G08G 1/168 |
| 2019/0102634 | A1* | 4/2019 | Sagami | G06K 9/00825 |
| 2020/0117927 | A1* | 4/2020 | Oba | G06T 7/00 |

* cited by examiner

DEVICE AND METHOD FOR DISPLAYING TARGET PARKING SPACE OF VEHICLE

CROSS-REFERENCE TO RELATED APPLICATION

This application claims the benefit of priority to Korean Patent Application No. 10-2017-0133438, filed on Oct. 13, 2017 in the Korean Intellectual Property Office, the disclosure of which is incorporated herein in its entirety by reference.

TECHNICAL FIELD

The present disclosure relates to a device and a method for displaying a target parking space of a vehicle and, more particularly, to a technology for displaying a target parking space of a vehicle on a top-view image by predicting the target parking space (space substantially occupied by the vehicle) within an empty parking section in cooperation with a parking assist system and a top-view imaging system when the empty parking section is detected during automatic parking.

BACKGROUND

In general, when a novice driver or a driver who is poor at parking parks a vehicle in a narrow space, the driver may fail to accurately predict distances to other vehicles parked on the front and rear or both sides of a target parking space, and thus may park the vehicle by driving the vehicle forward or backward several times.

When the distance to a nearby vehicle is predicted inaccurately, a minor collision with the parked vehicle may occur or a vehicle door may not be opened normally since the distance to the nearby vehicle is small. In particular, since it is very difficult to secure visibility through a side-view mirror or a rear-view mirror at night compared to the daytime, parking at night may be more difficult.

To solve these problems, a parking assist system may generate a parking trajectory on the basis of information collected from various sensors, and locate the vehicle in a desired space while following the corresponding trajectory.

After searching for a plurality of empty parking sections (where no other vehicles are parked), a conventional parking assist system may not provide a driver with an image (image obtained by predicting a state in which the vehicle is parked) of a target parking space within each parking section, and thus it may be difficult for the driver to select an optimal empty parking section from among the plurality of empty parking sections.

In other words, the conventional parking assist system may not provide the driver with the image of the target parking space within each parking section, thereby failing to allow the driver to select the optimal parking section.

SUMMARY

The present disclosure has been made to solve the above-mentioned problems occurring in the prior art while advantages achieved by the prior art are maintained intact.

An aspect of the present disclosure provides a device and a method for displaying a target parking space of a vehicle, capable of predicting a target parking space (space substantially occupied by the vehicle) within an empty parking section on the basis of a parking reference point acquired from a parking assist system and a top-view image acquired from a top-view imaging system, and displaying the target parking space on the top-view image, thereby allowing a driver to select an optimal empty parking section.

The object of the present disclosure is not limited to the foregoing object, and any other objects and advantages not mentioned herein will be clearly understood from the following description. The present inventive concept will be more clearly understood from exemplary embodiments of the present disclosure. In addition, it will be apparent that the objects and advantages of the present disclosure can be achieved by elements and features claimed in the claims and a combination thereof.

According to an aspect of the present disclosure, a device for displaying a target parking space of a vehicle may include: an information collector collecting a parking reference point and a width of a search space from a parking assist system; an image acquirer acquiring a top-view image; a controller detecting parking section information corresponding to the parking reference point from the top-view image, and detecting a target parking space occupied by the vehicle on the basis of the detected parking section information, the parking reference point, and the width of the search space; and a display displaying the detected target parking space on the top-view image.

The controller may control the display to display the target parking space on the basis of the parking reference point when no parking section dividing line is detected from the parking section information corresponding to the parking reference point on the top-view image.

The parking section information may include a width of a parking section and the number of parking section dividing lines.

The controller may calculate a width of a determination area corresponding to each parking section dividing line using the width of the parking section and the width of the search section.

The controller may control the display to display the target parking space on the basis of the parking reference point when the parking reference point is included in the determination area.

The controller may control the display to display the target parking space on the basis of the parking section dividing line when the parking reference point is not included in the determination area.

When the number of parking section dividing lines is two, the controller may control the display to display the target parking space between the two parking section dividing lines.

When the number of parking section dividing lines is one, the controller may control the display to display the target parking space to be spaced apart from the parking section dividing line by a predetermined distance.

According to another aspect of the present disclosure, a method for displaying a target parking space of a vehicle may include steps of: collecting, by an information collector, a parking reference point and a width of a search space from a parking assist system; acquiring, by an image acquirer, a top-view image; detecting, by a controller, parking section information corresponding to the parking reference point from the top-view image, and detecting a target parking space occupied by the vehicle on the basis of the detected parking section information, the parking reference point, and the width of the search space; and controlling, by the controller, a display to display the detected target parking space on the top-view image.

The controlling step may include controlling the display to display the target parking space on the basis of the parking reference point when no parking section dividing line is detected from the parking section information corresponding to the parking reference point on the top-view image.

The parking section information may include a width of a parking section and the number of parking section dividing lines.

The step of detecting the target parking space may include calculating a width of a determination area corresponding to each parking section dividing line using the width of the parking section and the width of the search section.

The controlling step may include controlling the display to display the target parking space on the basis of the parking reference point when the parking reference point is included in the determination area.

The controlling step may include controlling the display to display the target parking space on the basis of the parking section dividing line when the parking reference point is not included in the determination area.

The controlling step may include controlling the display to display the target parking space between two parking section dividing lines when the number of parking section dividing lines is two.

The controlling step may include controlling the display to display the target parking space to be spaced apart from the parking section dividing line by a predetermined distance when the number of parking section dividing lines is one.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

According to exemplary embodiments of the present disclosure, a parking section refers to a section of a roadway where parking is legally permitted. The parking section may include a plurality of section dividing lines (white painted lines) that represent a boundary between vehicles. In addition, a target parking space refers to an area occupied by the vehicle within a single parking section or an area occupied by the vehicle over a plurality of parking spaces. The target parking space may be predicted on the basis of parking reference point information acquired from a parking assist system and parking section information (the width of the parking section, the number of parking section dividing lines, and the like) detected from a top-view image acquired from a top-view imaging system. The predicted target parking space may be represented by a vehicle-shaped icon.

According to exemplary embodiments of the present disclosure, the parking assist system may include a smart parking assist system (SPAS), and the top-view imaging system may include an around view monitoring (AVM) system and a surround view monitoring (SVM) system.

Figure 1:
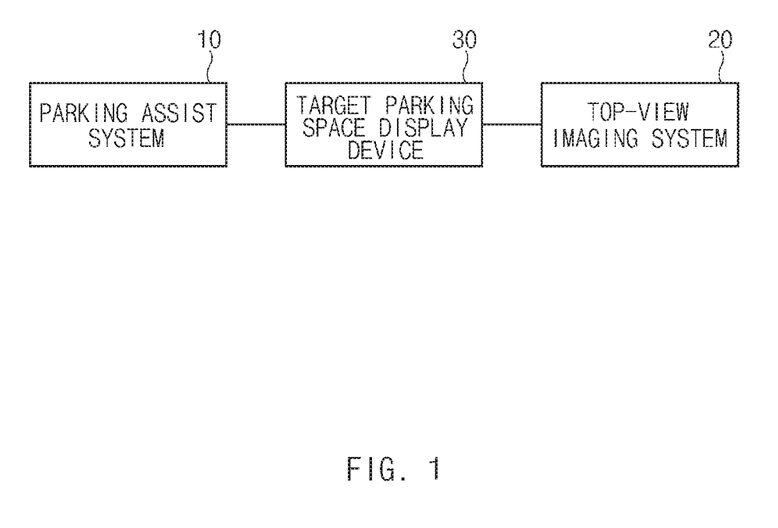
FIG. 1 illustrates the configuration of a system for displaying a target parking space of a vehicle to which a target parking space display device according to an exemplary embodiment of the present disclosure is applied.

FIG. 1 illustrates the configuration of a system for displaying a target parking space of a vehicle to which a target parking space display device according to an exemplary embodiment of the present disclosure is applied.

As illustrated in FIG. 1, the target parking space display system may include a parking assist system 10, a top-view imaging system 20, and a target parking space display device 30.

The parking assist system 10 is a system that calculates a parking trajectory to automatically move the vehicle into a parking section. The parking assist system 10 may be activated by a driver, search for empty parking sections in which no other vehicles are parked, generate information on a parking reference point with respect to the searched empty parking sections, and automatically park the vehicle in an empty parking section selected by the driver using the corresponding parking reference point information. Here, the parking reference point information may indicate a point (coordinates) at which the vehicle is to be located within the empty parking section. When the vehicle is parked, a specific location of the vehicle (point $C_1$ of FIG. 4 during perpendicular parking, point $C_2$ of FIG. 6 during parallel parking) may coincide with the parking reference point within an error range.

For example, the parking assist system 10 may include a plurality of rear-view sensors consisting of a master sensor module and a slave sensor module, a local interconnect network (LIN), a display module, and a speaker module.

The rear-view sensors may be generally composed of four sensors, and be connected to the LIN and be disposed on a rear bumper of the vehicle with a predetermined interval therebetween. The rear-view sensors may be configured to obtain required power from a power source supplying power to backlights (not shown), and thus the installation thereof may be easy.

The master sensor module of the rear-view sensors may be connected to the slave sensor module through the LIN to operate as a master, and may include a CPU, an ultrasonic sensor, a transceiver and a distance calculation module.

The CPU of the master sensor module may initialize each module connected to the LIN when a reverse gear signal is input. Then, the CPU may control the ultrasonic sensor to detect reflected waves reflected by an obstacle at a predetermined period. When the detected result is transmitted from the ultrasonic sensor to the CPU, the CPU may transmit the detected result to the distance calculation module. In addition, when a result detected by the slave sensor module is transmitted through the transceiver, the CPU may transmit the detected result to the distance calculation module.

The ultrasonic sensor of the master sensor module may emit ultrasonic waves under the control of the CPU, detect the reflected waves reflected by the obstacle, and transmit the detected result to the CPU. In the exemplary embodiment of the present disclosure, the ultrasonic sensor is exemplified as a sensor for measuring distance, but the inventive concept is not limited thereto. It will be apparent to those skilled in the art that various sensors such as an infrared sensor may be used.

The transceiver of the master sensor module may function as a communication interface with the LIN.

The distance calculation module of the master sensor module may calculate a distance to the obstacle on the basis of the detected result of the ultrasonic sensor. The calculated result may be transmitted to the display module or the speaker module.

The slave sensor module of the rear-view sensors may be connected to the master sensor module through the LIN to operate as a slave, and may include a CPU, an ultrasonic sensor, and a transceiver.

The CPU of the slave sensor module may be initialized according to an initialization command input from the master sensor module. Then, the CPU may control the ultrasonic sensor to detect reflected waves reflected by an obstacle at a predetermined period. When the detected result is transmitted from the ultrasonic sensor to the CPU, the CPU may transmit the detected result to the master sensor module through the transceiver.

The ultrasonic sensor of the slave sensor module may emit ultrasonic waves under the control of the CPU, and detect the reflected waves reflected by the obstacle.

The transceiver of the slave sensor module may function as a communication interface with the LIN.

The LIN may be a network protocol developed on the basis of a controller area network (CAN), and used for system decentralization of CAN communication terminals of a vehicle network. According to exemplary embodiments of the present disclosure, the LIN may be directly connected to the plurality of rear-view sensors, the display module, and the speaker module.

The display module may be a liquid crystal display device mounted in front of the driver's seat of the vehicle. When the distance to the obstacle is transmitted from the master sensor module, the display module may inform the driver of the distance by a visualization method.

Meanwhile, when the distance to the obstacle is transmitted from the master sensor module, the speaker module may inform the driver of the distance by sounds. In particular, the speaker module may output three levels of sounds depending on distance.

Figure 2:
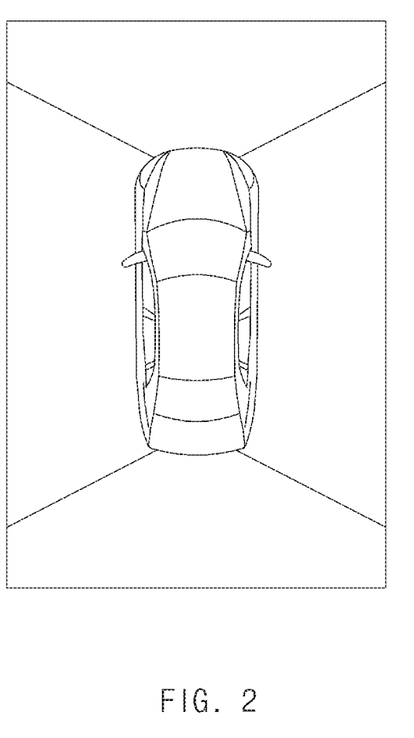
FIG. 2 illustrates a top-view image generated by a top-view imaging system, according to an exemplary embodiment of the present invention.

The top-view imaging system 20 may use images acquired from cameras mounted on the front, rear, left, and right sides of the vehicle to generate an image (top-view image) as if the driver looks at the vehicle from the top as illustrated in FIG. 2.

For example, the top-view imaging system 20 may include a signal processor, a camera, a communicator, a storage, and an image converter. Here, the signal processor may process signals transmitted between the aforementioned elements of the top-view imaging system 20.

The camera may be mounted on the vehicle to take images of the surroundings of the vehicle. A plurality of cameras may be provided. For example, the cameras may be mounted on the front, rear, left, and right sides of the vehicle. The images of the front, rear, left, and right sides of the vehicle captured by the cameras may be transmitted to the image converter to generate the top-view image.

The communicator may support a communication interface for vehicle to vehicle (V2V) communications. In addition, the communicator may communicate with at least one nearby vehicle around a subject vehicle to receive the top-view image and information of the nearby vehicle. In addition, the communicator may support a communication interface for differential GPS (DGPS) communications. Thus, the communicator may receive position information between the subject vehicle and the nearby vehicle through the DGPS communications.

In addition, the communicator may include a mobile communication module, a wireless internet module, a short range communication module, and the like.

The mobile communication module may transmit and receive a wireless signal to and from at least one of a base station, an external terminal, and a server in a mobile communication network established according to communication standards or communication methods for mobile communication (for example, Global System for Mobile communication (GSM), Code Division Multiple Access (CDMA), Code Division Multiple Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTEA), and the like). Here, the wireless signal may include various types of data according to transmission/reception of a voice call signal, a video call signal, or a text/multimedia message.

The wireless internet module refers to a module for wireless internet access, and may be configured to transmit and receive wireless signals in a communication network according to wireless internet technologies.

For example, the wireless internet technologies include Wireless LAN (WLAN), Wireless-Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. The wireless internet module may transmit and receive data according to at least one wireless internet technology in a range including internet technologies not listed above.

In the view that wireless internet access by WiBro, HSDPA, HSUPA, GSM, CDMA, WCDMA, LTE, LTE-A, and the like, is made through the mobile communication network, the wireless internet module performing wireless internet access through the mobile communication network may be understood as a kind of the mobile internet module.

The short range communication module may support short range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB), and the like.

The storage may store a setting value for operations of the top-view imaging system, and status information and results for each operation. For example, the storage may store the top-view image of the subject vehicle and the top-view image of the nearby vehicle, and also store a synthetic image of the top-view image of the subject vehicle and the top-view image of the nearby vehicle. In addition, the storage may store an image synthesis algorithm for synthesizing the top-view images.

The storage may include at least one storage medium selected from among a flash memory, a hard disk, a solid status disk (SSD), a silicon disk drive (SDD), a multimedia card micro type memory, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The image converter may generate the top-view image from the images of the surroundings of the subject vehicle captured by the cameras. Here, in order to generate the top-view image, the image converter may convert the images of the surroundings of the subject vehicle into the top-view image.

The target parking space display device 30 may predict the target parking space (space occupied by the vehicle when parking) within the empty parking section on the basis of the parking reference point information acquired from the parking assist system 10 and the parking section information detected from the top-view image acquired from the top-view imaging system 20, and display the predicted result on the top-view image. Here, the target parking space display device 30 may acquire the parking section information from the top-view imaging system 20.

The target parking space display device 30 may predict the target parking space within the parking section on the basis of a width of the parking section in the parking section information detected from the top-view image and a width of a search space acquired from the parking assist system 10.

Hereinafter, the width of the parking section and the width of the search space will be described in detail with reference to FIG. 3.

Figure 3:
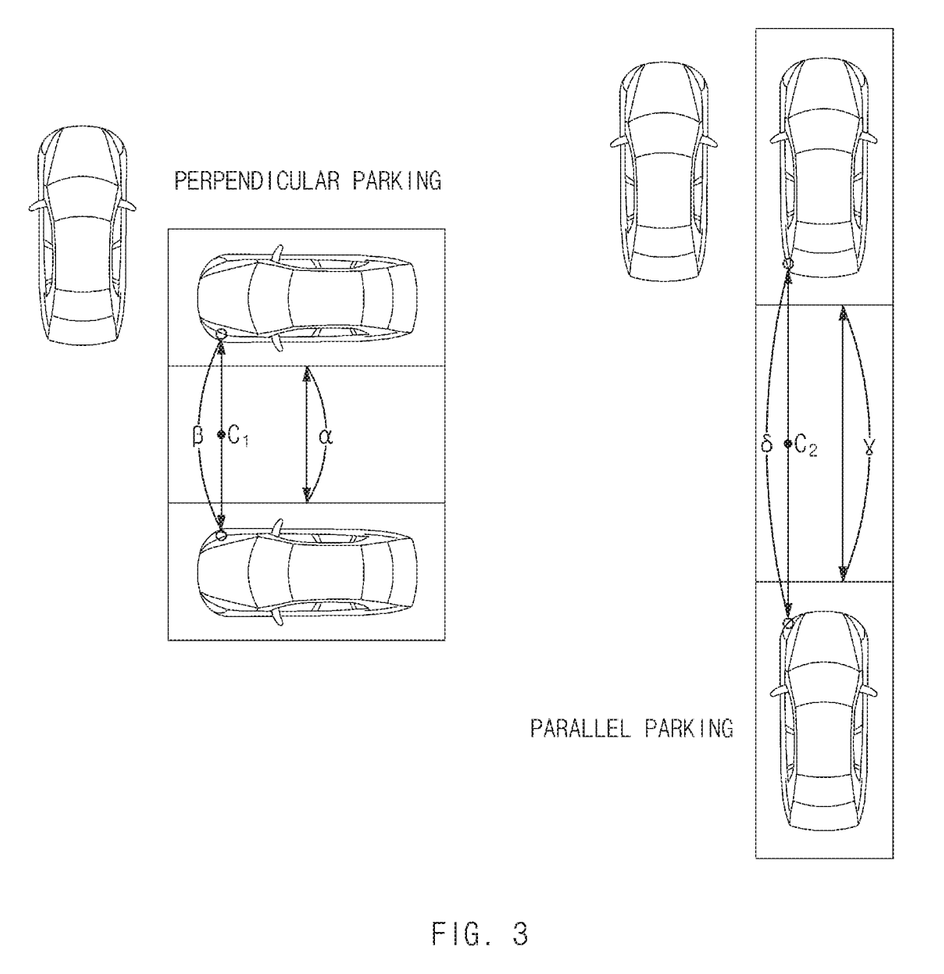
FIG. 3 illustrates a width of a parking section and a width of a search space, according to an exemplary embodiment of the present disclosure.

As illustrated in FIG. 3, α represents a width of a parking section for perpendicular parking, and β represents a width of a search space for perpendicular parking. Here, $C_1$ is a center point of β and refers to a parking reference point when perpendicular parking.

γ represents a width of a parking section for parallel parking, and δ represents a width of a search space for parallel parking. Here, $C_2$ is a center point of δ and refers to a parking reference point when parallel parking.

In addition, the target parking space display device 30 may calculate a width of a determination area used for predicting a target parking space within an empty parking section. For example, a width $w_1$ of a determination area used in perpendicular parking may be calculated on the basis of equation 1 below.

$$w_1=(\alpha-(\beta\times0.5))\times2 \qquad \text{Equation 1}$$

The calculated width $w_1$ of the determination area refers to the size of an area defined with a parking section dividing line as the center, the parking section dividing line forming a boundary between vehicles.

Figure 4:
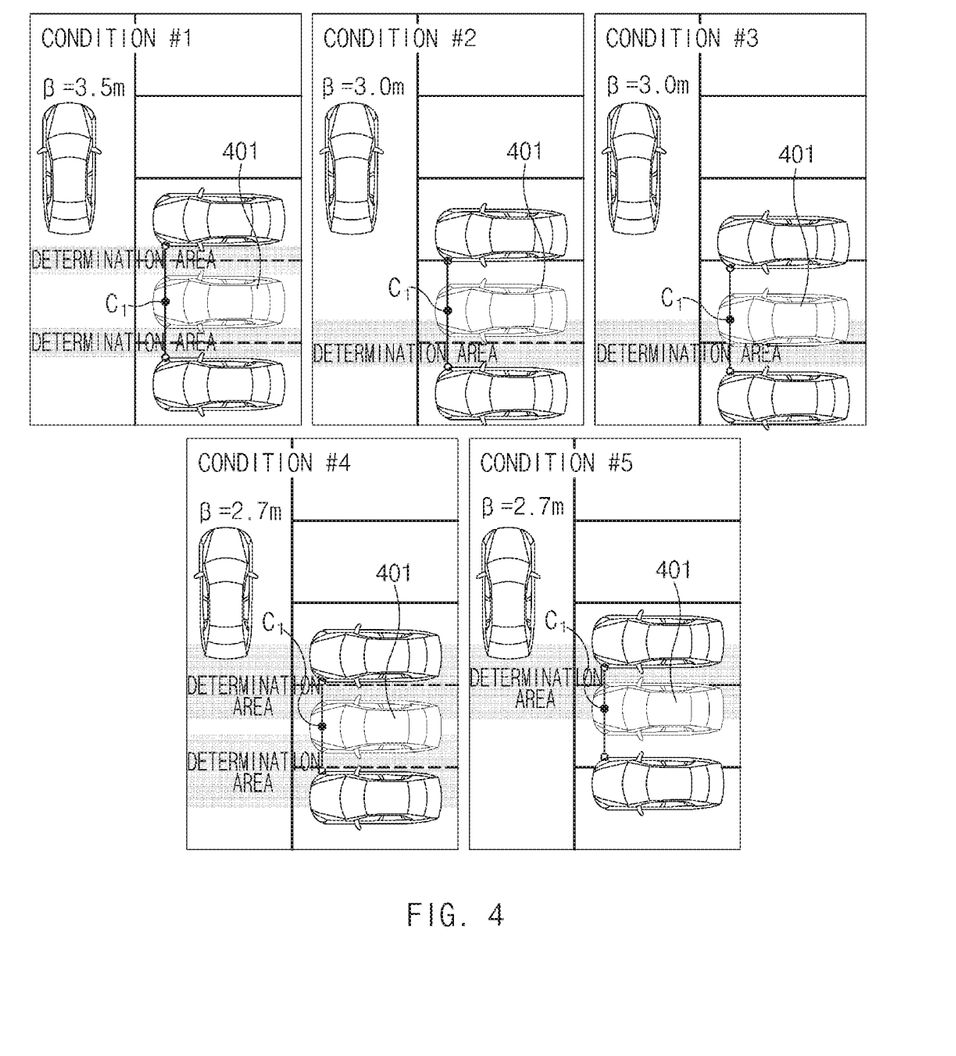
FIG. 4 illustrates a determination area generated by a target parking space display device when perpendicular parking, according to an exemplary embodiment of the present disclosure.

Hereinafter, a process of calculating a width of a determination area when there are other vehicles on both sides of an empty parking section will be described in detail with reference to FIG. 4. In FIG. 4, "401" denotes an icon (virtual image) representing a target parking space, and the icon may be displayed by the target parking space display device 30 in a final operation. Thus, the process of calculating the width of the determination area should be understood in a state in which the icon 401 is not displayed. In other words, the process of calculating the width of the determination area will be described regardless of the icon 401.

As illustrated in FIG. 4, condition #1 indicates that the width of the parking section is 2.5 m, the width of the search space is 3.5 m, and two parking section dividing lines are detected. The determination area is formed to have a width of 1.5 m based on each parking section dividing line (dotted line) of the empty parking section. Here, the parking section dividing line refers to a line representing a boundary between the vehicles.

Condition #2 indicates that the width of the parking section is 2.5 m, the width of the search space is 3.0 m, and one parking section dividing line is detected. The determination area is formed to have a width of 2 m based on a lower parking section dividing line (dotted line) of the empty parking section. Here, an upper parking section dividing line is not detected since it is covered by another vehicle, and thus the width of the corresponding determination area is not calculated.

Condition #3 indicates that the width of the parking section is 2.5 m, the width of the search space is 3.0 m, and one parking section dividing line is detected. The determination area is formed to have a width of 2 m based on a lower parking section dividing line (dotted line) of the empty parking section. Here, condition #3 differs from condition #2 in that the parking reference point $C_1$ is included in the determination area.

Condition #4 indicates that the width of the parking section is 2.5 m, the width of the search space is 2.7 m, and two parking section dividing lines are detected. The determination area is formed to have a width of 2.3 m based on each parking section dividing line (dotted line) of the empty parking section.

Condition #5 indicates that the width of the parking section is 2.5 m, the width of the search space is 2.7 m, and one parking section dividing line is detected. The determination area is formed to have a width of 2.3 m based on an upper parking section dividing line (dotted line) of the empty parking section. Here, condition #5 differs from condition #4 in that the parking reference point $C_1$ is included in the determination area.

Figure 5:
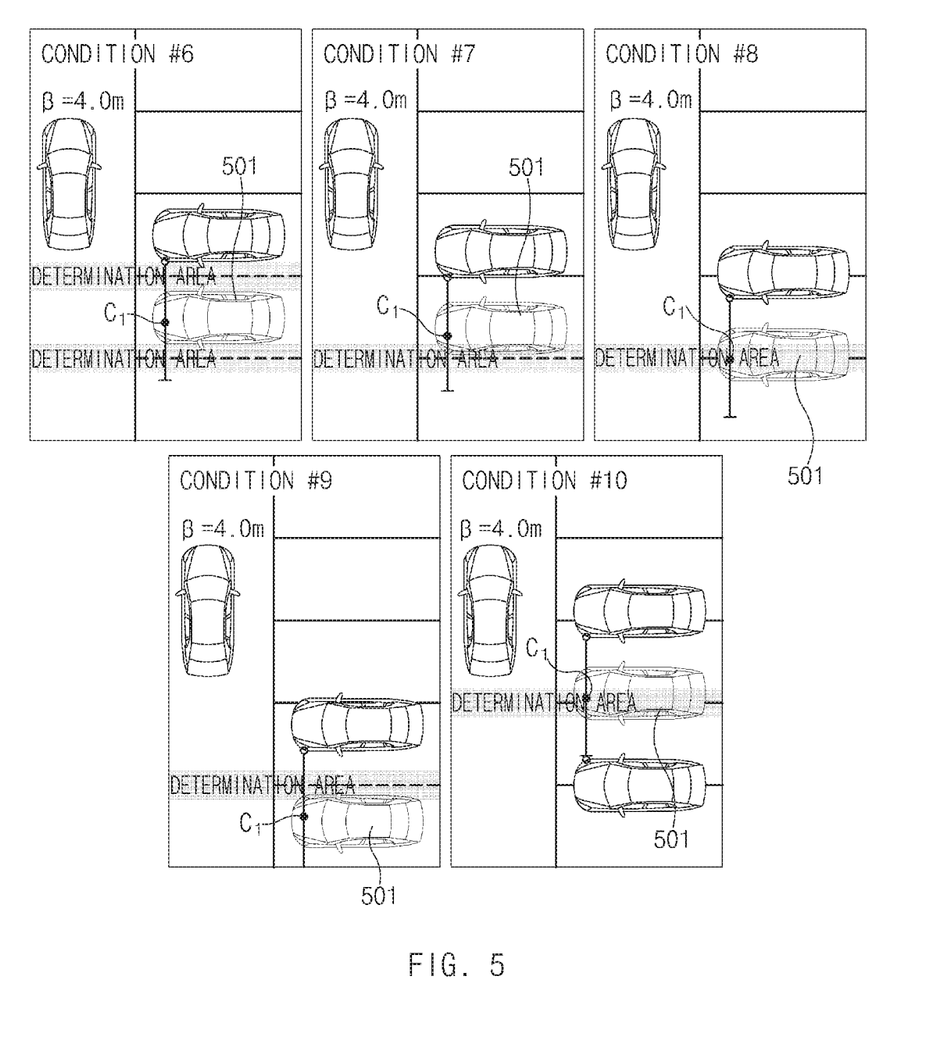
FIG. 5 illustrates a determination area generated by a target parking space display device when perpendicular parking, according to another exemplary embodiment of the present disclosure.

Hereinafter, a process of calculating a width of a determination area when there is another vehicle on one side of an empty parking section will be described in detail with reference to FIG. 5. In FIG. 5, "501" denotes an icon (virtual image) representing a target parking space, and the icon may be displayed by the target parking space display device 30 in a final operation. Thus, the process of calculating the width of the determination area should be understood in a state in which the icon 501 is not displayed. In other words, the process of calculating the width of the determination area will be described regardless of the icon 501.

As illustrated in FIG. 5, condition #6 indicates that the width of the parking section is 2.5 m, the width of the search space is 4.0 m, and two parking section dividing lines are detected. The determination area is formed to have a width of 1 m based on each parking section dividing line (dotted line) of the empty parking section.

Condition #7 indicates that the width of the parking section is 2.5 m, the width of the search space is 4.0 m, and one parking section dividing line is detected. The determination area is formed to have a width of 1 m based on a lower parking section dividing line (dotted line) of the empty parking section. Here, an upper parking section dividing line is not detected since it is covered by another vehicle, and thus the width of the corresponding determination area is not calculated.

Condition #8 indicates that the width of the parking section is 2.5 m, the width of the search space is 4.0 m, and one parking section dividing line is detected. The determination area is formed to have a width of 1 m based on a lower parking section dividing line (dotted line) of the empty parking section. Here, an upper parking section dividing line is not detected since it is covered by another vehicle, and condition #8 differs from condition #7 in that the parking reference point $C_1$ is included in the determination area.

Condition #9 indicates that the width of the parking section is 2.5 m, the width of the search space is 4.0 m, and one parking section dividing line is detected. The determination area is formed to have a width of 1 m based on an upper parking section dividing line (dotted line) of the empty parking section.

Condition #10 indicates that the width of the parking section is 2.5 m, the width of the search space is 4.0 m, and one parking section dividing line is detected. The determination area is formed to have a width of 1 m based on an upper parking section dividing line (dotted line) of the empty parking section. Here, condition #10 differs from condition #9 in that the parking reference point $C_1$ is included in the determination area.

For example, a width $w_2$ of a determination area used in parallel parking may be calculated on the basis of equation 2 below.

$$w_2 = (\gamma - (\delta \times 0.5)) \times 2 \qquad \text{Equation 2}$$

The calculated width $w_2$ of the determination area refers to the size of an area defined with a parking section dividing line as the center, the parking section dividing line forming a boundary between vehicles.

Figure 6:
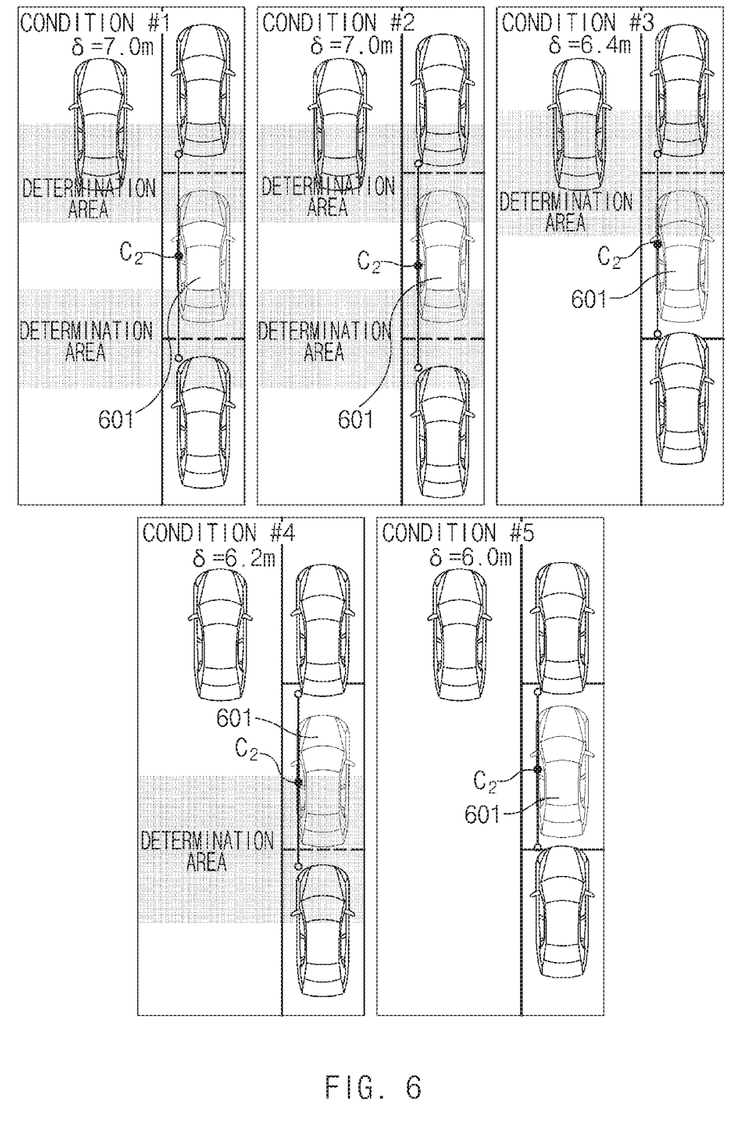
FIG. 6 illustrates a determination area generated by a target parking space display device when parallel parking, according to an exemplary embodiment of the present disclosure.

Hereinafter, a process of calculating a width of a determination area when there are other vehicles on both sides of an empty parking section will be described in detail with reference to FIG. 6. In FIG. 6, "601" denotes an icon (virtual image) representing a target parking space, and the icon may be displayed by the target parking space display device 30 in a final operation. Thus, the process of calculating the width of the determination area should be understood in a state in which the icon 601 is not displayed. In other words, the process of calculating the width of the determination area will be described regardless of the icon 601.

As illustrated in FIG. 6, condition #1 indicates that the width of the parking section is 6 m, the width of the search space is 7 m, and two parking section dividing lines are detected. The determination area is formed to have a width of 5 m based on each parking section dividing line (dotted line) of the empty parking section.

Condition #2 indicates that the width of the parking section is 6 m, the width of the search space is 7 m, and two parking section dividing lines are detected. The determination area is formed to have a width of 5 m based on each parking section dividing line (dotted line) of the empty parking section. Here, condition #2 differs from condition #1 in that the other vehicles are parked in different locations. However, since conditions #1 and #2 are the same in that the parking reference point is not included in the determination area, the same target parking space is set.

Condition #3 indicates that the width of the parking section is 6 m, the width of the search space is 6.4 m, and one parking section dividing line is detected. The determination area is formed to have a width of 4.6 m based on an upper parking section dividing line (dotted line) of the empty parking section. Here, a lower parking section dividing line is not detected since it is covered by another vehicle, and thus the width of the corresponding determination area is not calculated.

Condition #4 indicates that the width of the parking section is 6 m, the width of the search space is 6.2 m, and one parking section dividing line is detected. The determination area is formed to have a width of 5.8 m based on a lower parking section dividing line (dotted line) of the empty parking section. Here, an upper parking section dividing line is not detected since it is covered by another vehicle, and thus the width of the corresponding determination area is not calculated.

Condition #5 indicates that any parking section dividing lines of the empty parking section are not detected, and thus the width of the determination area is not calculated.

Figure 7:
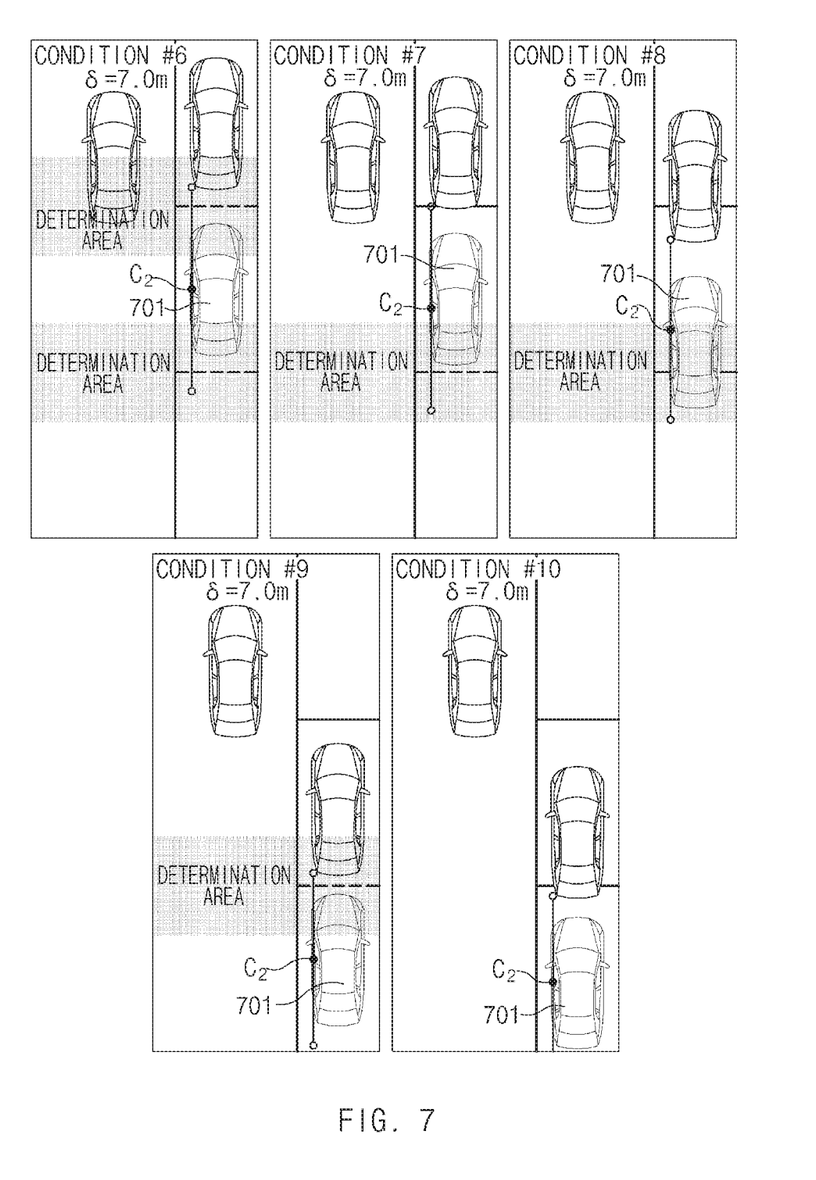
FIG. 7 illustrates a determination area generated by a target parking space display device when parallel parking, according to another exemplary embodiment of the present disclosure.

Hereinafter, a process of calculating a width of a determination area when there is another vehicle on one side of an empty parking section will be described in detail with reference to FIG. 7. In FIG. 7, "701" denotes an icon (virtual image) representing a target parking space, and the icon may be displayed by the target parking space display device 30 in a final operation. Thus, the process of calculating the width of the determination area should be understood in a state in which the icon 701 is not displayed. In other words, the process of calculating the width of the determination area will be described regardless of the icon 701.

As illustrated in FIG. 7, condition #6 indicates that the width of the parking section is 6 m, the width of the search space is 7 m, and two parking section dividing lines are detected. The determination area is formed to have a width of 5 m based on each parking section dividing line (dotted line) of the empty parking section.

Condition #7 indicates that the width of the parking section is 6 m, the width of the search space is 7 m, and one parking section dividing line is detected. The determination area is formed to have a width of 5 m based on a lower parking section dividing line (dotted line) of the empty parking section. Here, an upper parking section dividing line is not detected since it is covered by another vehicle, and thus the width of the corresponding determination area is not calculated.

Condition #8 indicates that the width of the parking section is 6 m, the width of the search space is 7 m, and one parking section dividing line is detected. The determination area is formed to have a width of 5 m based on a lower parking section dividing line (dotted line) of the empty parking section. Here, an upper parking section dividing line is not detected since it is covered by another vehicle, and thus the width of the corresponding determination area is not calculated. In this case, condition #8 differs from condition #7 in that the parking reference point $C_2$ is included in the determination area.

Condition #9 indicates that the width of the parking section is 6 m, the width of the search space is 7 m, and one parking section dividing line is detected. The determination area is formed to have a width of 5 m based on an upper parking section dividing line (dotted line) of the empty parking section.

Condition #10 indicates that any parking section dividing lines of the empty parking section are not detected, and thus the width of the determination area is not calculated.

Meanwhile, the target parking space display device 30 may display the target parking space icon 401 or 501 in a single parking section or a plurality of parking sections on the basis of the calculated determination area (condition #1-10) and the parking reference point when perpendicular parking.

As illustrated in FIG. 4, since the parking reference point $C_1$ is not included in the determination area in condition #1, the target parking space icon 401 may be displayed between both parking section dividing lines (for example, the center) of the empty parking section.

Since the parking reference point $C_1$ is not included in the determination area in condition #2, the target parking space icon 401 may be displayed to be spaced apart from one parking section dividing line of the empty parking section by a predetermined distance (for example, 30 cm).

Since the parking reference point $C_1$ is included in the determination area in condition #3, the target parking space icon 401 may be displayed on the basis of the parking reference point $C_1$. In other words, the target parking space icon 401 may be displayed to correspond to the parking reference point $C_1$.

Since the parking reference point $C_1$ is not included in the determination area in condition #4, the target parking space icon 401 may be displayed between both parking section dividing lines (for example, the center) of the empty parking section.

Since the parking reference point $C_1$ is included in the determination area in condition #5, the target parking space icon 401 may be displayed on the basis of the parking reference point $C_1$.

As illustrated in FIG. 5, since the parking reference point $C_1$ is not included in the determination area in condition #6, the target parking space icon 501 may be displayed between both parking section dividing lines (for example, the center) of the empty parking section.

Since the parking reference point $C_1$ is not included in the determination area in condition #7, the target parking space icon 501 may be displayed to be spaced apart from one parking section dividing line of the empty parking section by a predetermined distance (for example, 30 cm).

Since the parking reference point $C_1$ is included in the determination area in condition #8, the target parking space icon 501 may be displayed on the basis of the parking reference point $C_1$.

Since the parking reference point $C_1$ is not included in the determination area in condition #9, the target parking space icon 501 may be displayed to be spaced apart from one parking section dividing line of the empty parking section by a predetermined distance (for example, 30 cm).

Since the parking reference point $C_1$ is included in the determination area in condition #10, the target parking space icon 501 may be displayed on the basis of the parking reference point $C_1$.

Meanwhile, the target parking space display device 30 may display the target parking space icon 601 or 701 in a single parking section or a plurality of parking sections on the basis of the calculated determination area (condition #1-10) and the parking reference point when parallel parking.

As illustrated in FIG. 6, since the parking reference point $C_2$ is not included in the determination area in condition #1, the target parking space icon 601 may be displayed between both parking section dividing lines (for example, the center) of the empty parking section.

Since the parking reference point $C_2$ is not included in the determination area in condition #2, the target parking space icon 601 may be displayed between both parking section dividing lines (for example, the center) of the empty parking section.

Since the parking reference point $C_2$ is not included in the determination area in condition #3, the target parking space icon 601 may be displayed to be spaced apart from one parking section dividing line of the empty parking section by a predetermined distance (for example, 50 cm).

Since the parking reference point $C_2$ is included in the determination area in condition #4, the target parking space icon 601 may be displayed on the basis of the parking reference point $C_2$.

Since any parking section dividing lines of the empty parking section are not detected in condition #5, the target parking space icon 601 may be displayed on the basis of the parking reference point $C_2$. In other words, the target parking space icon 601 may be displayed to correspond to the parking reference point $C_2$. This case indicates that the parking assist system 10 determines that parking is possible even though the other vehicles slightly occupy portions of the empty parking section.

As illustrated in FIG. 7, since the parking reference point $C_2$ is not included in the determination area in condition #6, the target parking space icon 701 may be displayed between both parking section dividing lines (for example, the center) of the empty parking section.

Since the parking reference point $C_2$ is not included in the determination area in condition #7, the target parking space icon 701 may be displayed to be spaced apart from one parking section dividing line of the empty parking section by a predetermined distance (for example, 50 cm).

Since the parking reference point $C_2$ is included in the determination area in condition #8, the target parking space icon 701 may be displayed on the basis of the parking reference point $C_2$.

Since the parking reference point $C_2$ is not included in the determination area in condition #9, the target parking space icon 701 may be displayed to be spaced apart from one parking section dividing line of the empty parking section by a predetermined distance (for example, 50 cm).

Since any parking section dividing lines of the empty parking section are not detected in condition #10, the target parking space icon 701 may be displayed on the basis of the parking reference point $C_2$.

In the exemplary embodiment of the present disclosure, the configuration of the target parking space display device 30 and the top-view imaging system 20 as separate elements has been described as an example. However, alternatively, the target parking space display device 30 may be provided inside the top-view imaging system 20 to be operated by a controller of the top-view imaging system 20.

Figure 8:
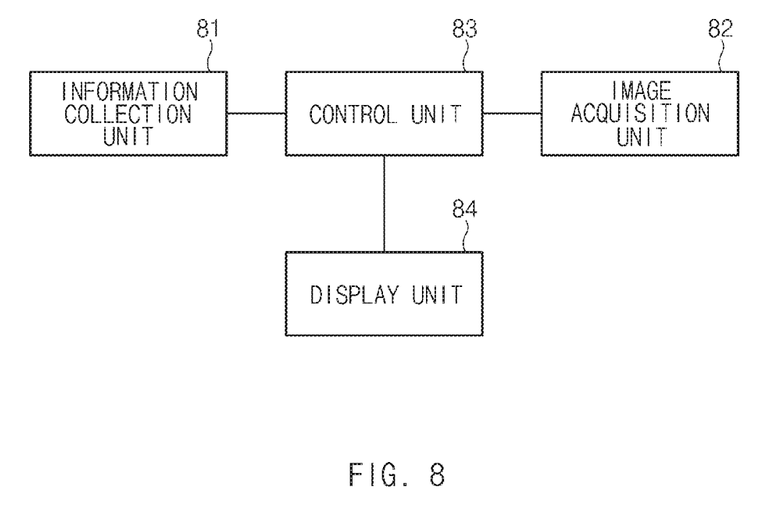
FIG. 8 illustrates the configuration of a device for displaying a target parking space of a vehicle, according to an exemplary embodiment of the present disclosure.

FIG. 8 illustrates the configuration of a target parking space display device, according to an exemplary embodiment of the present disclosure. In the following exemplary embodiment of the present disclosure, the configuration of respective elements as separate individual units will be described as an example. However, alternatively, a controller 83 may be configured to perform the functions of an information collector 81 and a top-view image acquirer 82.

As illustrated in FIG. 8, the target parking space display device, according to the exemplary embodiment of the present disclosure, includes the information collector 81, the top-view image acquirer 82, the controller 83, and a display 84.

With regard to each of the aforementioned elements, the information collector 81 may provide an interface with the parking assist system 10, and interlock with the parking assist system 10 to collect information on the parking reference point (coordinates) and the width of the search space.

The top-view image acquirer 82 may provide an interface with the top-view imaging system, and interlock with the top-view imaging system to acquire the top-view image. Here, the top-view image acquirer 82 may be a cameral, an image sensor or the like to acquire the parking section information (the width of the parking section, the number of parking section dividing lines, and the like).

The controller 83 may detect the parking section information corresponding to the parking reference point information from the top-view image acquired by the top-view image acquirer 82, and detect a space (target parking space) occupied by the vehicle on the basis of the detected parking section information, and the information on the parking reference point and the width of the search space collected by the information collector 81.

In addition, the controller 83 may control the display 84 to display the detected target parking space on the top-view image.

In other words, the controller 83 may calculate a width of a determination area for each parking section dividing line on the basis of equation 1 and equation 2.

In addition, the controller 83 may determine whether or not the parking reference point is included in the determination area for each parking section dividing line. When the parking reference point is not included in the determination area for each parking section dividing line, the controller 83 may control the display 84 to display the target parking space on the basis of the parking section dividing line. When two parking section dividing lines of the empty parking section where the vehicle is to be parked are detected, the display 84 may display the target parking space between two parking section dividing lines. In addition, when one parking section dividing line of the empty parking section where the vehicle is to be parked is detected, the display 84 may display the target parking space to be spaced apart from the parking section dividing line by a predetermined distance.

The predetermined distance may be 30 cm in perpendicular parking, and 50 cm in parallel parking.

In addition, when the parking reference point is included in the determination area for each parking section dividing line, the controller 83 may control the display 84 to display the target parking space on the basis of the parking reference point.

In addition, when any parking section dividing line is not detected from the parking section information corresponding to the parking reference point on the top-view image, the controller 83 may control the display 84 to display the target parking space on the basis of the parking reference point.

Figure 9:
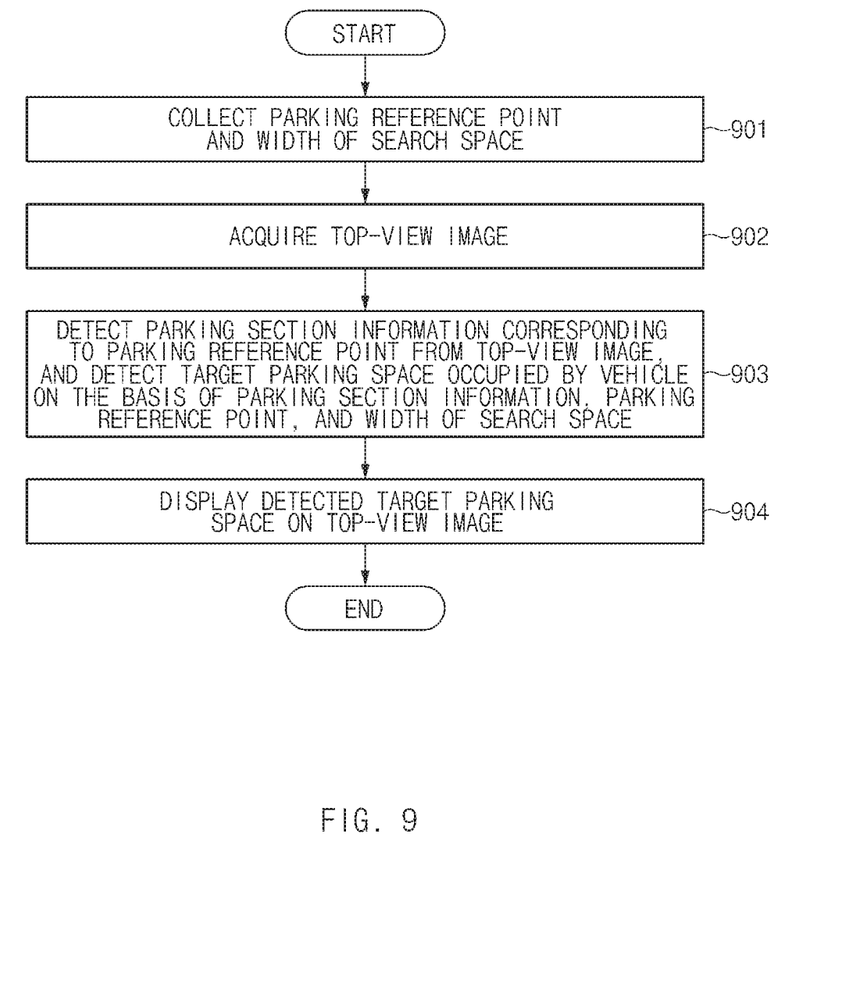
FIG. 9 illustrates a flowchart of a method for displaying a target parking space of a vehicle, according to an exemplary embodiment of the present disclosure.

FIG. 9 illustrates a flowchart of a method for displaying a target parking space of a vehicle, according to an exemplary embodiment of the present disclosure.

First, the information collector 81 may collect a parking reference point and a width of a search space from the parking assist system in operation 901.

Next, the image acquirer 82 may acquire a top-view image in operation 902.

Thereafter, the controller 83 may detect parking section information corresponding to the parking reference point from the top-view image, and detect a target parking space occupied by the vehicle on the basis of the detected parking section information, the parking reference point, and the width of the search space in operation 903.

Then, the controller 83 may control the display 84 to display the detected target parking space on the top-view image in operation 904.

As set forth above, the target parking space display device and method, according to exemplary embodiments of the present disclosure, may be capable of predicting the target parking space (space substantially occupied by the vehicle) within the empty parking section on the basis of the parking reference point information acquired from the parking assist system and the top-view image acquired from the top-view imaging system, and displaying the target parking space on the top-view image, thereby allowing the driver to select an optimal empty parking section.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for displaying a target parking space of a vehicle, the device comprising:
   an information collector collecting a parking reference point and a width of a search space from a parking assist system;
   an image acquirer acquiring a top-view image;
   a controller detecting parking section information, which includes a width of a parking section, corresponding to the parking reference point from the top-view image, and detecting a target parking space to be occupied by the vehicle on the basis of the detected parking section information, the parking reference point, and the width of the search space; and
   a display displaying the detected target parking space as a vehicle-shaped icon on the top- view image,
   wherein the controller calculates a width of a determination area corresponding to each of parking section dividing lines on the basis of equation A below:

$$w = (\alpha - (\beta \times 0.5)) \times 2 \qquad \text{Equation A,}$$

where w represents the width of the determination area,
α represents the width of the parking section, and
β represents the width of the search space.

2. The device according to claim 1, wherein the controller controls the display to display the target parking space on the basis of the parking reference point when no parking section dividing line is detected from the parking section information corresponding to the parking reference point on the top-view image.

3. The device according to claim 1, wherein the parking section information further includes the number of the parking section dividing lines.

4. The device according to claim 3, wherein the controller controls the display to display the target parking space on the basis of the parking reference point when the parking reference point is included in the determination area.

5. The device according to claim 3, wherein the controller controls the display to display the target parking space on the basis of the parking section dividing line when the parking reference point is not included in the determination area.

6. The device according to claim 5, wherein, when the number of parking section dividing lines is two, the controller controls the display to display the target parking space between the two parking section dividing lines.

7. The device according to claim 5, wherein, when the number of parking section dividing lines is one, the controller controls the display to display the target parking space to be spaced apart from the parking section dividing line by a predetermined distance.

8. A method for displaying a target parking space of a vehicle, the method comprising steps of:
  collecting, by an information collector, a parking reference point and a width of a search space from a parking assist system;
  acquiring, by an image acquirer, a top-view image;
  detecting, by a controller, parking section information, which includes a width of a parking section, corresponding to the parking reference point from the top-view image, and detecting a target parking space to be occupied by the vehicle on the basis of the detected parking section information, the parking reference point, and the width of the search space; and
  controlling, by the controller, a display to display the detected target parking space as a vehicle-shaped icon on the top-view image,
  wherein the step of detecting a target parking space comprises calculating a width of a determination area corresponding to each of parking section dividing lines on the basis of equation A below:

$$w=(\alpha-(\beta\times0.5))\times2 \qquad \text{Equation A,}$$

where w represents the width of the determination area,
α represents the width of the parking section, and
β represents the width of the search space.

9. The method according to claim 8, wherein the controlling step comprises controlling the display to display the target parking space on the basis of the parking reference point when no parking section dividing line is detected from the parking section information corresponding to the parking reference point on the top-view image.

10. The method according to claim 8, wherein the parking section information further includes the number of the parking section dividing lines.

11. The method according to claim 10, wherein the controlling step comprises controlling the display to display the target parking space on the basis of the parking reference point when the parking reference point is included in the determination area.

12. The method according to claim 10, wherein the controlling step comprises controlling the display to display the target parking space on the basis of the parking section dividing line when the parking reference point is not included in the determination area.

13. The method according to claim 12, wherein the controlling step comprises controlling the display to display the target parking space between two parking section dividing lines when the number of parking section dividing lines is two.

14. The method according to claim 12, wherein the controlling step comprises controlling the display to display the target parking space to be spaced apart from the parking section dividing line by a predetermined distance when the number of parking section dividing lines is one.

* * * * *